Patented July 25, 1933

1,919,766

UNITED STATES PATENT OFFICE

CARL L. BEAL, OF AKRON, OHIO, ASSIGNOR TO THE B. F. GOODRICH COMPANY, OF NEW YORK, N. Y., A CORPORATION OF NEW YORK

METHOD OF PROTECTING RUBBER SURFACES

No Drawing.   Application filed November 16, 1928. Serial No. 320,009.

This invention relates to the protection of surfaces from corrosion, and particularly to the protection of surfaces exposed to the corrosive action of strong oxidizing acids or continuously exposed to atmospheric oxidation.

The protection of metal and other surfaces from the action of concentrated nitric acid, chromic acid, etc. has offered considerable difficulties. Rubber although resistant to dilute or non-oxidizing acids, is oxidized and destroyed by oxidizing substances. The hydrochloride of rubber is sufficiently resistant to the action of oxidizing substances, but has heretofore been prepared in a benzol solution, which has been applied to the surfaces to be coated by dipping, brushing, or spraying. Coatings thus applied do not adhere satisfactorily, and tend to be rather brittle.

This invention consists in applying a coating or lining of soft rubber to the surfaces to be protected, and converting the rubber to the rubber hydrochloride in situ. The rubber may be applied in many different ways, depending upon the material, shape, and construction of the surface to be coated. For example, the rubber may be molded in contact with the surface while in a plastic condition; or it may be applied in solution in a solvent such as benzene or gasoline, or in the form of a water dispersion such as natural latex, the solution of dispersion being applied by dipping, spraying or brushing; or, if the surface is of metal, the rubber may be deposited electrophoretically from a water dispersion. The rubber may be vulcanized with sulphur and organic accelerators in the usual manner, or by any other convenient method, or may even be unvulcanized rubber. It may contain softeners, fillers, or pigments, but should contain only very small proportions of acid-soluble materials such as zinc oxide or whiting, since solution of these salts during the subsequent treatment with hydrochloric acid would leave a spongy or porous structure. If it is desired to reinforce the product, the rubber may contain a fibrous binder which is substantially not attacked by the hydrochloric acid. The coating may be caused to adhere to the surface, for example by coating the surface with a thin layer of a heat-plastic rubber isomer such as is obtained by the exothermal reaction of 100 parts of rubber and 7.5 parts of p-phenol sulphonic acid.

The adherent rubber coating, applied by one of the methods outlined above, or by any other convenient method, is then at least partially converted into the rubber hydrohalide by exposure to a hydrogen halide. Hydrogen chloride in concentrated aqueous solution has been found most convenient, because of its cheapness and availability and because of the ease with which it may be handled. Rubber immersed in concentrated hydrochloric acid at room temperature is slowly converted into the hydrochloride, but the reaction is much more rapid at higher temperatures. At about 70° C., for example, hydrochloric acid produces a white hard film on the surface of the rubber after 3 or 4 days. At the end of a week's immersion the layer of the hydrochloride has become about 0.4 mm. thick, and after two weeks, about 0.8 mm. A further increase in temperature does not seem to accelerate the reaction very much, possibly because the solubility of hydrogen chloride in water decreases with increasing temperature. The reaction may be further accelerated by employing more concentrated solutions of hydrogen chloride under pressure. However the reaction of hydrogen chloride with rubber at atmospheric pressure may be accelerated by adding a chloride of an amphoteric metal, such as zinc chloride or aluminum chloride, or a similar catalytic salt, to the acid solution. The addition of organic solvents such as ether, acetone, benzene, etc. also greatly increases the rate of reaction, probably because they increase the permeability of the rubber to the hydrogen chloride. Ether is particularly effective because of the very great solubility of hydrogen chloride therein, and because it swells the rubber and penetrates it rapidly. For example, a solution prepared in the proportions of 1 kilogram of zinc chloride and 200 milliliters of acetone to 1 liter of concentrated hydrochloric acid (about 38% hydrogen chloride) is so active that rubber samples immersed therein for 3 days at a temperature of about 65° C. were converted to the rubber hydrochloride to a depth of almost a millimeter. A solution containing ether acts even more rapidly.

If the articles which are to be protected are of metal, it is important that the acid does not penetrate the rubber coating and attack the metal, but it has been found that if the rubber is converted to the hydrochloride for only about one third of its thickness, that practically no such trouble is experienced. Thus the above solution of zinc chloride, acetone, and hydrochloric acid may be employed in converting into the hydrochloride about one millimeter of a 3 millimeter rubber coating on metal. If the article is of wood or other material which is not appreciably affected by hydrochloric acid, a large proportion, or even all of the rubber coating, may be thus converted. Articles made entirely or chiefly of rubber may likewise be protected by conversion of the surface to the rubber hydrochloride.

The rubber hydrochloride surfaces prepared by immersing rubber or rubber-covered articles in hydrogen chloride solution are tough, rather horny, and effectively resist cutting and abrasion, but are still flexible. They are practically inalterable, not being appreciably affected by sunlight, or by natural oxidation. Weak oxidizing agents have almost no effect and strong oxidizing agents such as hot or concentrated sulfuric, nitric, or chromic acids attack the surfaces only slowly. The method of this invention is therefore found very useful in the protection of metals or other corrodible materials from the action of such oxidizing substances.

The tough leathery nature of the rubber hydrochloride surface makes it very valuable in covering such articles as tool handles. The surface is smooth and tough, and has a low coefficient of friction against most materials, yet the unchanged soft rubber layer under the rubber hydrochloride surface cushions and protects this relatively hard layer from the cutting effect of sharp blows.

It is obvious that hydrogen fluoride, bromide, or iodide may be substituted for the hydrogenchloride, either in whole or in part, a rubber hydrohalide being formed. The rubber hydrobromide, and especially the rubber hydriodide, are not as stable and inert as the hydrochloride, but possess other useful properties such as the firm, tough, durable texture common to the rubber hydrohalides.

It is to be understood that the term "rubber" is employed in the appended claims in a generic sense to include caoutchouc, whether natural or synthetic, reclaimed rubber, balata, gutta percha, rubber isomers, and like products, whether or not admixed with fillers, pigments, or vulcanizing agents. The term "rubber articles" is likewise employed in a generic sense to include articles made wholly of rubber or a rubber composition, as well as those containing reinforcing material, and those made of wood, metal, or other material covered or protected by an adherent coating of rubber.

I claim:

1. The method which comprises treating rubber articles with a solution containing a hydrogen halide and a halide of an amphoteric metal, whereby the surface of the article is rendered resistant to the action of oxidizing substances.

2. The method which comprises treating rubber articles with a solution containing a hydrogen halide, a halide of an amphoteric metal, and an organic solvent for the hydrogen halide, whereby the surface of the article is rendered resistant to the action of oxidizing substances.

3. The method which comprises treating rubber articles with an aqueous solution comprising hydrogen chloride and a chloride of an amphoteric metal, whereby the surface of the article is converted to rubber hydrochloride.

4. The method which comprises treating rubber articles with an aqueous solution comprising hydrogen chloride, a chloride of an amphoteric metal, and an organic solvent for hydrogen chloride, whereby the surface of the article is converted to rubber hydrochloride.

5. The method which comprises treating articles coated with vulcanized soft rubber with an aqueous solution comprising hydrogen chloride, a chloride of an amphoteric metal, and acetone, whereby the surface of the coating is converted to rubber hydrochloride.

6. The method which comprises treating articles coated with vulcanized soft rubber with an aqueous solution comprising hydrogen chloride, zinc chloride, and acetone, in approximately the proportions of 1 kilogram zinc chloride and 200 milliliters acetone to 1 liter concentrated hydrochloric acid, whereby the surface of the coating is converted to rubber hydrochloride.

7. The method which comprises treating rubber articles with a solution containing a hydrogen bromide, and a halide of an amphoteric metal, whereby the surface of the article is rendered resistant to the action of oxidizing substances.

8. The method which comprises treating rubber articles with a solution containing a hydrogen bromide and a bromide of an amphoteric metal, whereby the surface of the article is rendered resistant to the action of oxidizing substances.

CARL L. BEAL.